UNITED STATES PATENT OFFICE.

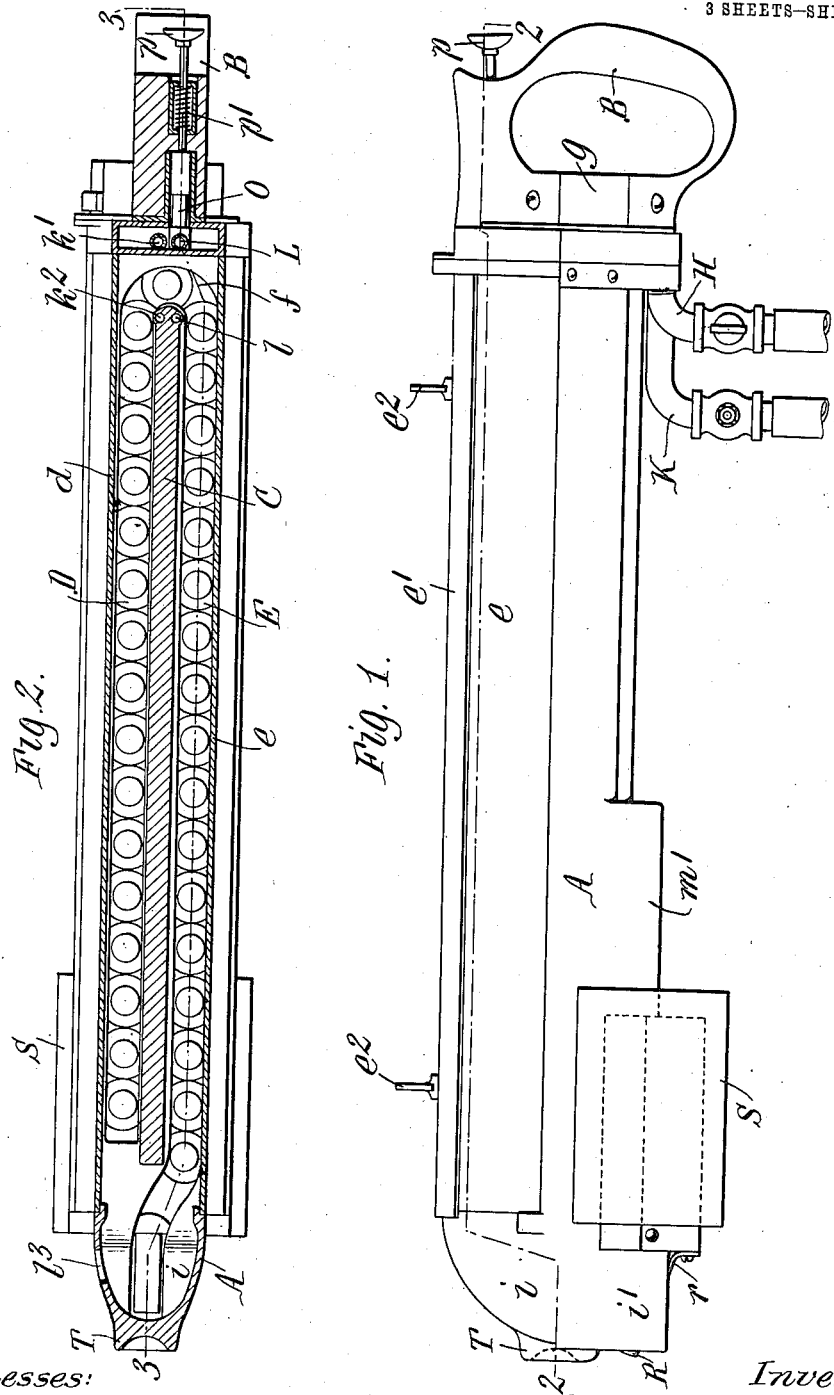

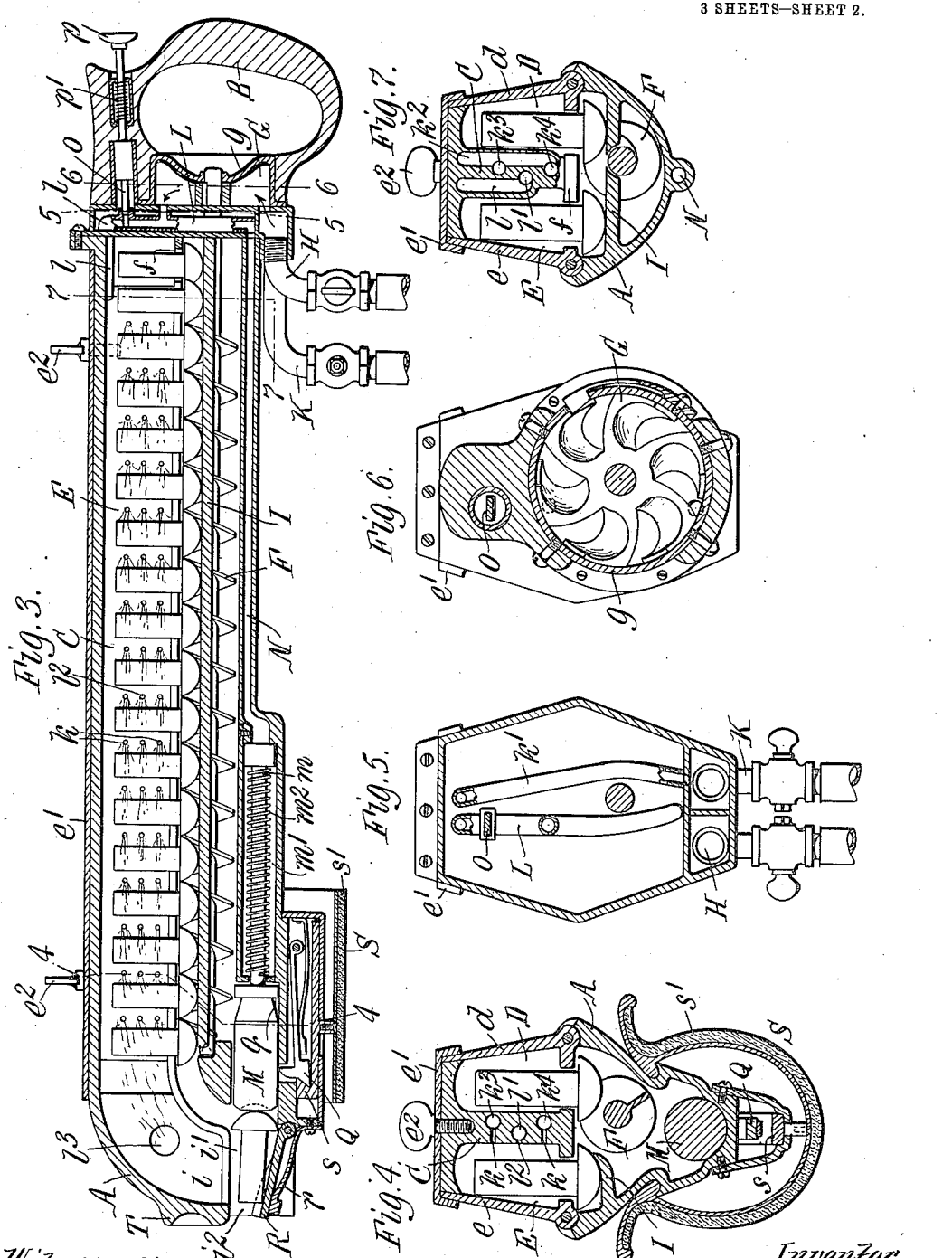

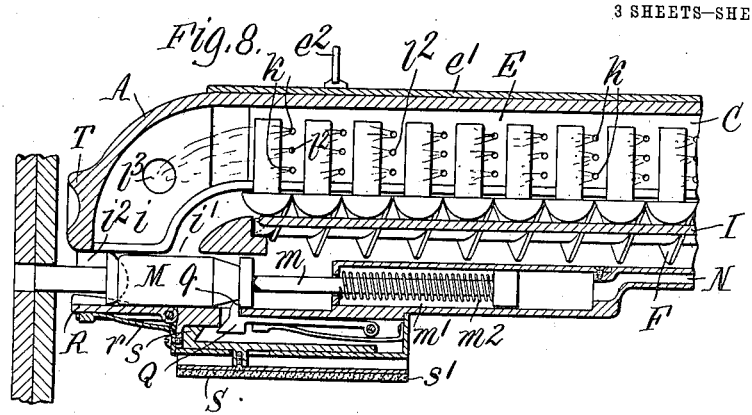
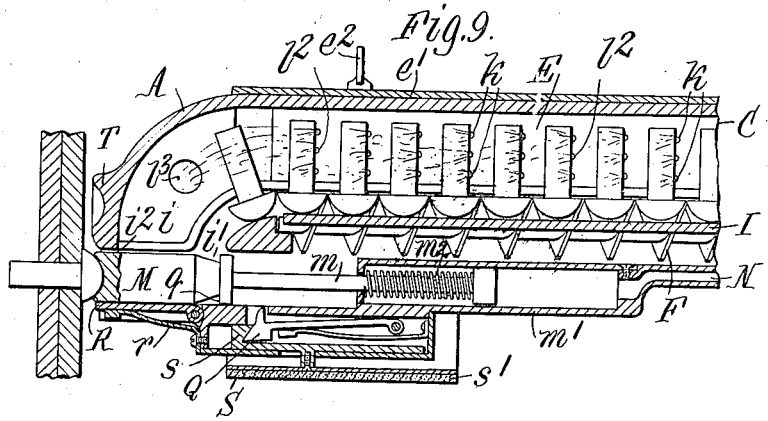
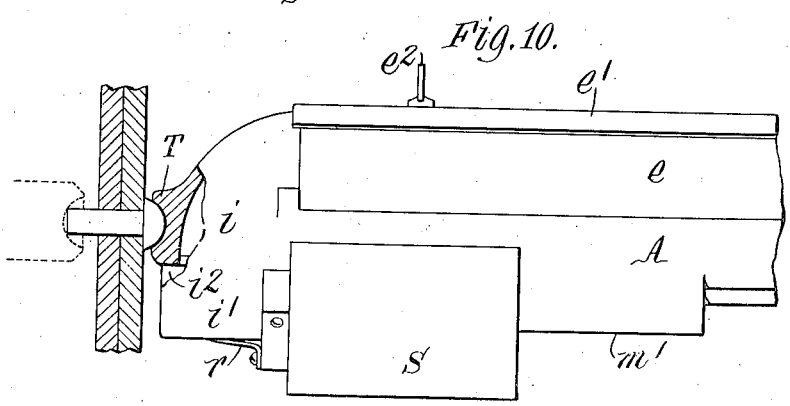

GEZA SZEMEREY, OF NEW YORK, N. Y., ASSIGNOR TO OSCAR GAST, OF BUFFALO, NEW YORK.

RIVET HEATING AND HOLDING TOOL.

1,125,411.　　　　Specification of Letters Patent.　　Patented Jan. 19, 1915.

Application filed August 23, 1909. Serial No. 514,205.

*To all whom it may concern:*

Be it known that I, GEZA SZEMEREY, a subject of the King of Hungary, residing at New York city, in the county and State of New York, have invented a new and useful Improvement in Rivet Heating and Holding Tools, of which the following is a specification.

This invention relates more particularly to a portable magazine tool for heating rivets, feeding the heated rivets to the work as required and holding them while they are being headed in the work.

One of the principal objects of the invention is to produce a desirable and practical portable or hand tool by which a considerable number of rivets can be heated and kept in readiness for use and which can be readily operated to place the rivets in the rivet holes of the work and to hold them while they are being headed.

Other objects of the invention are to produce a portable tool of this character having a conveyer for moving a number of rivets in procession slowly from a magazine through a heating chamber from which they are discharged in succession, whereby the rivets can be heated to a substantially uniform temperature suitable for riveting as rapidly as they are required for use; also to provide a pneumatically actuated device controlled by a valve adapted to be readily operated by the hand holding the tool for discharging the rivets; also to provide means for enabling the rivet to be held partially protruding from the tool until its end is inserted in the rivet hole and then completely ejecting the rivet or shoving it into place in the rivet hole; also to construct the tool so that it can be quickly and easily filled with rivets; and also to construct the device in other respects hereinafter described and set forth in the claims, whereby it can be readily operated for the intended purpose.

In the accompanying drawings, consisting of three sheets: Figure 1 is a side elevation of a rivet heating and feeding tool embodying the invention. Fig. 2 is a sectional plan view thereof in line 2—2, Fig. 1. Fig. 3 is a longitudinal sectional elevation thereof in line 3—3, Fig. 2. Figs. 4, 5, 6 and 7 are transverse sectional elevations thereof, on an enlarged scale, in lines 4—4, 5—5, 6—6, and 7—7, respectively, Fig. 3. Figs. 8 and 9 are longitudinal sectional elevations of the discharge end of the tool showing different positions of the parts. Fig. 10 is an elevation, partly in section, of the tool showing its use for holding a rivet while being headed.

Like reference characters refer to like parts in the several figures.

A represents the body of the tool which is provided at the rear end with a handle B adapted to be grasped by the hand for holding and manipulating the tool. The body of the tool is hollow and is divided by a longitudinal partition C into a magazine chamber D and a heating chamber E which extends lengthwise of the body at the opposite sides of the partition.

The magazine and heating chambers are filled with rivets which are placed on end with their heads lowermost, and to facilitate the loading of the tool and to enable the rivets to be removed therefrom if desired, the magazine and heating chambers are preferably provided with outer walls $d$ and $e$, respectively, which are hinged at their lower edges, as shown in Fig. 4, so that they are adapted to open outwardly. These hinged walls or doors may be held closed by suitable means, such, for instance, as a top plate $e'$ which is provided with edge flanges that embrace the upper edges of the hinged walls and is removably secured on the top of the tool body by screws $e^2$. The hinged walls $d$ and $e$ of the magazine and heating chambers have inwardly projecting flanges or portions at their lower edges forming between them and the partition C slots in the bottoms of the magazine and heating chambers through which the headed ends of the rivets depend, for coöperation with a conveyer for moving the rivets from the magazine chamber through the heating chamber for heating the rivets.

A rotary screw conveyer F is shown for this purpose, which is arranged longitudinally in the body of the tool, below the magazine chamber, and adapted to engage the heads of the rivets in this chamber, so that as the conveyer is revolved it shoves the rivets rearwardly through the magazine and through a curved passage $f$ around the rear end of the partition C into the rear end of the heating chamber. The rear end of the conveyer shaft is connected to a turbine or rotary motor wheel G which is located in a chamber $g$ in the rear end of the tool and is operated by compressed air admitted to the chamber through a valve-controlled supply pipe H. This conveyer moves the rivets slowly in the magazine chamber and this movement of the rivets in the magazine chamber and the passage $f$ connecting it with the heating chamber shoves the rivets forwardly in procession through the heating chamber.

The invention is not restricted to the described means for conveying or moving the rivets through the heating chamber, this conveying mechanism simply being selected as one means for the purpose, and other means could be used for moving the rivets successively through a chamber in which they are heated during their passage through it.

I represents a shelf or ledge which projects inwardly from the side of the body of the tool beneath the heating chamber and by which the rivets are supported while passing through this chamber. The heating chamber has a downwardly curved front portion $i$ open at its lower end, and the shelf I terminates somewhat in rear of this downturned portion of the heating chamber so that when each rivet clears the front of the shelf I it drops shank foremost from the open end of the heating chamber into a horizontal position in a discharge chamber $i'$, as shown in Fig. 3, in front of an ejecting device by which it is adapted to be ejected through the open front end of the discharge chamber, or discharge opening $i^2$ of the tool.

In the construction illustrated, the rivets are heated by flames produced in the heating chamber by gas issuing through jet orifices $k$ in the partition C. Gas is supplied for the flames from a suitable valve-controlled pipe K which is connected with the jet orifices $k$ by passages $k'$ and $k^2$ in the rear end of the body, and passages $k^3$ and $k^4$ extending longitudinally through the partition C. The air discharge passage L for the conveyer driving motor G is preferably connected by a passage $l$, Figs. 3 and 7, at the rear end of the tool and a passage $l'$ which extends longitudinally in the partition C and has a series of orifices $l^2$, Fig. 3, for supplying air to the heating chamber to support combustion and create the necessary draft forwardly through the heating chamber to an exit opening $l^3$ at the front end of the heating chamber.

M represents the rivet ejecting device, which, in the construction shown, consists of a plunger arranged to move forwardly in a suitable guide chamber in the body of the tool in rear of the discharge chamber $i'$ so as to engage the rivet in the discharge chamber and eject the same forwardly therefrom. This plunger is connected by a rod to a piston $m$ which works in a cylinder $m'$ in the lower portion of the tool body. The plunger and piston are retracted and normally held in the inward or rearward position shown in Fig. 3, by a suitable spring $m^2$ surrounding the piston rod. The rear end of the cylinder $m'$ is connected by a passage N to the discharge passage L for the air from the conveyer motor G. The air to the cylinder $m'$ for operating the ejector plunger is controlled by a suitable valve O in the discharge passage L for the conveyer motor. A slide valve is shown having a stem extending rearwardly through a guide opening in the handle of the tool, and provided at its outer end with a head $p$ adapted to be engaged by the thumb of the hand grasping the handle for operating the valve. The valve is normally held in its rearward or open position by a suitable spring $p'$ so as to maintain an open passage for the air from the conveyer motor to the discharge orifices into the heating chamber E and permit the air to discharge into the heating chamber to give the necessary draft for the gas flames, and the air passing to the ejector cylinder will not have sufficient pressure to operate the ejector plunger. When, however, the valve is closed by pressing it inwardly the air pressure will be increased sufficiently in the passage N and the ejector cylinder to move the ejector plunger forwardly for shoving the rivet in front of the plunger out of the discharge opening $i^2$.

Means are preferably provided for enabling the rivet to be arrested and held temporarily with its front end protruding from the discharge opening, so that the end of the rivet can be inserted into the hole in the work before the rivet is completely ejected from the tool. The means shown for this purpose consists of a spring latch Q, Figs. 3, 8 and 9, mounted on the body and adapted to engage a shoulder $q$ on the ejector plunger to arrest the plunger when the latter has projected the rivet partially out of the discharge opening, and pivoted bottom R for the discharge chamber which is pressed inwardly by a suitable spring $r$ so as to clamp and retain the rivet in the discharge chamber with its front end protruding therefrom. S represents a handle or hand grip which embraces and is slidably mounted on the underside of the front portion of the tool in a convenient position to be grasped by the hand for supporting the front end of the tool. This handle is provided with a lug $s$ having an inclined face adapted, by sliding the handle S rearwardly, to engage a coöperating inclined face on the ejector latch Q for retracting the latch to release the plunger. After the protruding end of the rivet has been inserted in the hole in the work, the handle S is slid rearwardly and the latch Q retracted, which allows the air pressure to move the ejector plunger to the limit of its forward movement for completely ejecting the rivet. The handle S is preferably provided with a covering s' of insulating material suitable for protecting the hand from the heat of the heating chamber.

After the rivet has been placed in the hole in the work, as explained, the nose T of the tool is placed against the head of the rivet, as shown in Fig. 10, to hold the rivet while the other end is being headed. A socket is formed in the nose T to receive the head of the rivet.

It is not intended in this application to limit the invention to the described construction of the tool and the particular devices employed for effecting the several operations of feeding the rivet to the heating means, heating them and ejecting them from the tool, it being believed that a magazine tool of the sort described for heating and supplying the heated rivets as required for use is new and that it is within the scope of the invention to employ different instrumentalities for securing these results.

I claim as my invention:

1. The combination in a portable hand tool for heating rivets and inserting them into the work, of a magazine adapted to hold a plurality of rivets, means for moving the rivets through the magazine, means for heating the rivets, and means constituting a part of the tool for moving the rivets from the tool into position in the work, substantially as set forth.

2. The combination in a portable hand tool for heating rivets and inserting them into the work, of a magazine for a plurality of rivets, means for feeding the rivets in succession from the magazine, means for heating the rivets in transit from the magazine to the point of discharge, and means constituting a part of the tool for moving the rivets from the tool into position in the work, substantially as set forth.

3. The combination in a portable hand tool for heating rivets and inserting them into the work, of a magazine for a plurality of rivets, a chamber in which the rivets are heated, means for feeding the rivets in succession from the magazine through the heating chamber, and means constituting a part of the tool for moving the rivets from the tool into position in the work, substantially as set forth.

4. The combination in a portable hand tool for heating rivets and inserting them into the work, of a magazine chamber for a plurality of rivets, a heating chamber, means for moving the rivets from the magazine chamber into the heating chamber, means for producing flames in the heating chamber for heating the rivets, and means for moving the rivets from the tool into position in the work, substantially as set forth.

5. The combination in a portable hand tool for heating rivets and inserting them into the work, of a magazine constructed to hold a plurality of rivets on end one in advance of the other, a heating chamber and means for heating the same, means for moving the rivets on end in procession from the magazine chamber through the heating chamber, and means carried by the tool for moving the rivets from the tool into position in the work, substantially as set forth.

6. The combination in a rivet heating and holding tool provided with a magazine chamber for a plurality of rivets and a heating chamber arranged side by side lengthwise of the tool, said chambers having movable side walls for opening the chambers, means for moving the rivets from the magazine into and through the heating chamber, means for heating the heating chamber, and means for discharging the heated rivets from the tool, substantially as set forth.

7. The combination in a portable hand tool for heating rivets and inserting them into the work, of a magazine for a plurality of rivets, means for heating the rivets, a pneumatically operated conveyer for moving the rivets from the magazine to the heating means, and means constituting a part of the tool for moving the rivets from the tool into position in the work, substantially as set forth.

8. The combination in a rivet heating and handling tool provided with a magazine for a plurality of rivets, of means for heating the rivets, a pneumatically operated conveyer for moving the rivets from the magazine to the heating means, and pneumatically operated means constituting a part of the tool for ejecting the heated rivets from the tool, substantially as set forth.

9. A portable rivet heating and handling tool comprising means adapted to heat a plurality of rivets, and means constituting a part of the tool operable at will for moving the rivets as required from the heating means to a position for inserting them in the work, substantially as set forth.

10. The combination in a portable rivet heating and handling tool provided with a heating chamber arranged lengthwise of the tool, of means for moving the rivets in succession through the heating chamber, and means for moving the heated rivets at will to a position in which they project outwardly from the tool, substantially as set forth.

11. The combination in a rivet heating and handling tool, of means for heating the rivets, a conveyer for moving the rivets through the heating means, and means constituting a part of the tool controllable for moving the heated rivets at will to a position in the tool in which they project outwardly beyond the tool, substantially as set forth.

12. The combination in a rivet heating and handling tool, of means for heating the rivets, a conveyer for moving the rivets through the heating means, means constituting a part of the tool controllable for moving the heated rivets at will to a position in the tool in which they project outwardly beyond the tool, and means for yieldingly holding the rivet in said position to enable the same to be inserted into the work, substantially as set forth.

13. A portable rivet heating and handling tool comprising a heating chamber for the rivets, means for feeding the rivets through the heating chamber, and hand actuated means constituting a part of the tool operable at will for moving the rivets to a position for inserting them into the work, substantially as set forth.

14. The combination in a portable rivet heating and handling tool, of means for heating a rivet, means for moving the rivet from the heating means to a position for inserting it into the work, and means on the tool for engaging the rivet while the same is being headed, substantially as set forth.

15. The combination in a portable rivet heating and handling tool, of means for heating a rivet, means for moving the rivet from the heating means to a position for inserting it into the work, and means for temporarily and releasably holding the rivet in said position, substantially as set forth.

16. The combination in a portable rivet heating and handling tool, of a heating chamber, means for passing the rivets in succession through the heating chamber and discharging the same from the heating chamber, and means for moving the rivets after they have been discharged from the heating chamber to a position in which they protrude partially from said tool, substantially as set forth.

17. The combination in a portable rivet heating and handling tool, of a heating chamber, means for passing the rivets in succession through the heating chamber and discharging the same from the heating chamber, means for moving the rivets after they have been discharged from the heating chamber to a position in which they protrude partially from said tool to enable the same to be inserted into the work, and means on said tool for engaging the rivet while the same is being headed, substantially as set forth.

18. The combination in a portable rivet heating and handling tool, of a heating chamber, means for passing the rivets in succession through the heating chamber and discharging the same from the heating chamber, means for moving the rivets after they have been discharged from the heating chamber to a position in which they protrude from said tool, and spring-actuated means for yieldingly holding the rivet in its protruding position, substantially as set forth.

19. The combination in a portable rivet heating and handling tool, of a heating chamber extending lengthwise of the tool, a conveyer which can be actuated at will for moving a plurality of rivets successively through said heating chamber and which causes the rivets to be discharged from said heating chamber, a plunger actuated at will to engage the rivets after they have been discharged from the heating chamber and which moves the rivets to a position in which they partially protrude from said tool to be inserted into the work, substantially as set forth.

Witness my hand, this 30th day of July, 1909.

GEZA SZEMEREY. [L. S.]

Witnesses:
  HENRY KNOBLOCH,
  JULIUS HARTMANN.